Feb. 19, 1952 G. J. LEPP ET AL 2,586,433
SEAT
Filed March 26, 1946 3 Sheets-Sheet 1
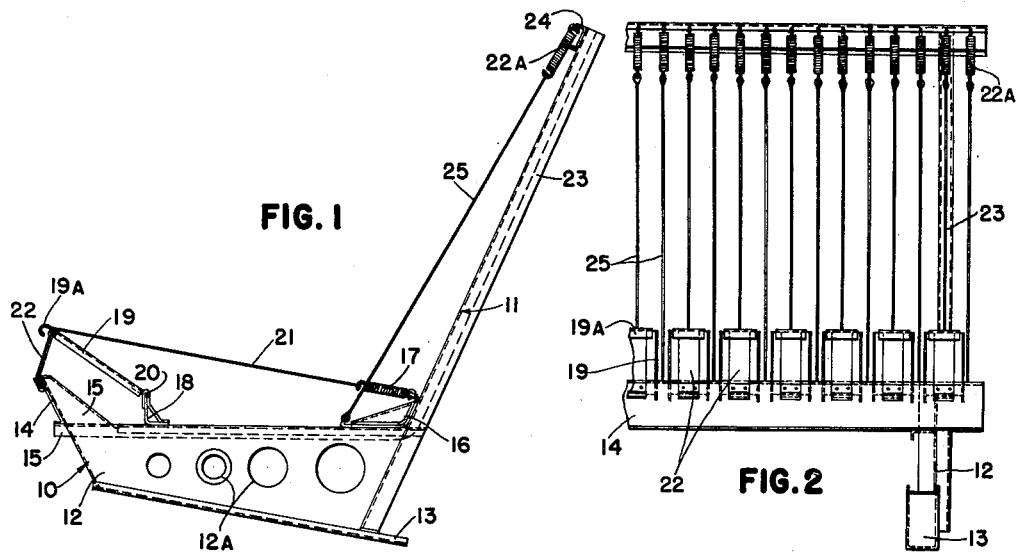
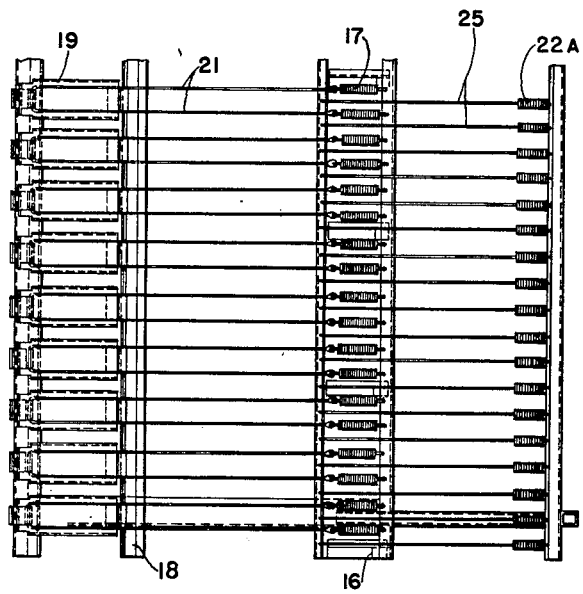
Inventors
GERHARD J. LEPP
RALPH C. BATEMAN
KEITH L. EMBERSON
By R. H. Watson
Attorney Feb. 19, 1952     G. J. LEPP ET AL     2,586,433
SEAT
Filed March 26, 1946     3 Sheets-Sheet 2
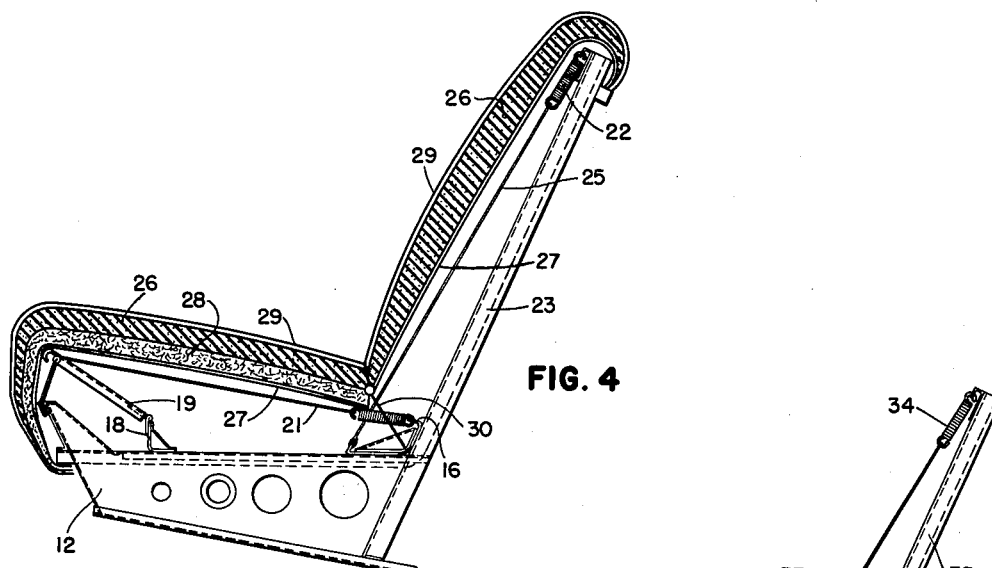
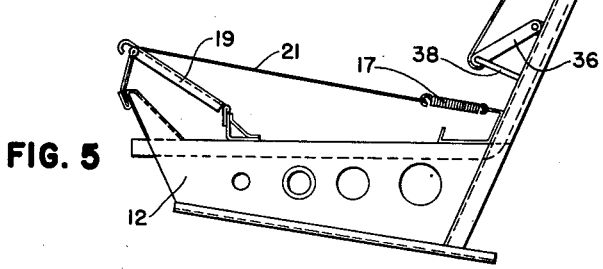
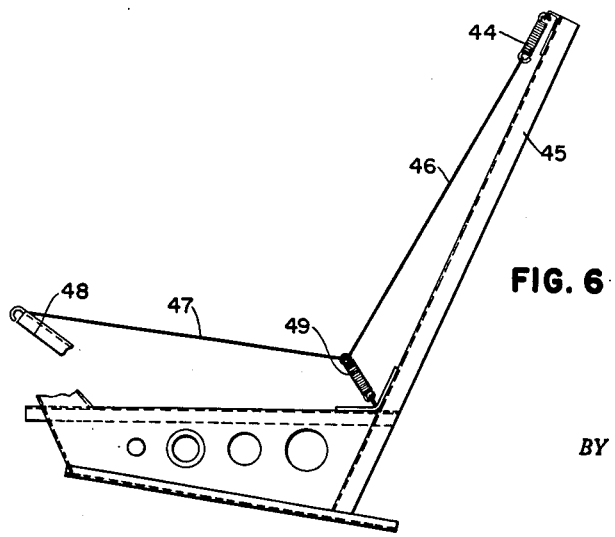
*INVENTORS*
GERHARD J. LEPP
RALPH C. BATEMAN
KEITH L. EMBERSON
BY
ATTORNEY Feb. 19, 1952  G. J. LEPP ET AL  2,586,433
SEAT
Filed March 26, 1946  3 Sheets-Sheet 3
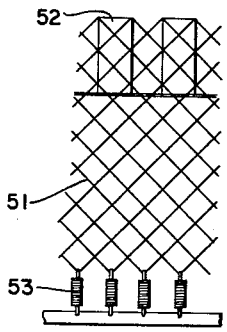
FIG. 7
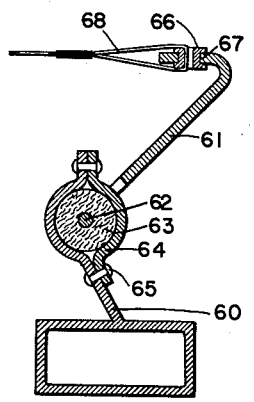
FIG. 8
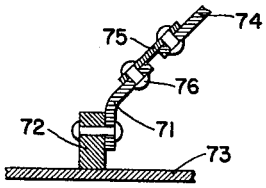
FIG. 9
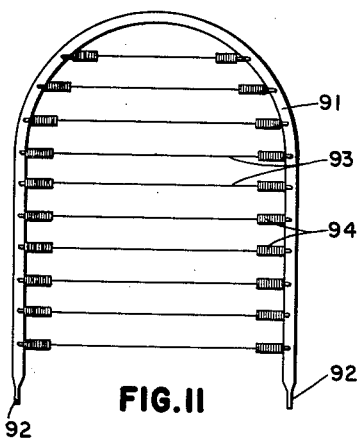
FIG. 11
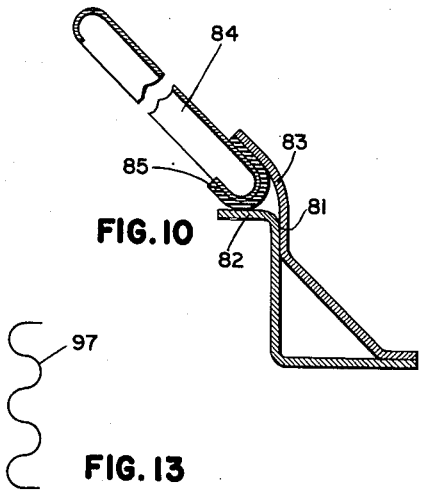
FIG. 10
FIG. 13
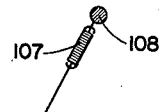
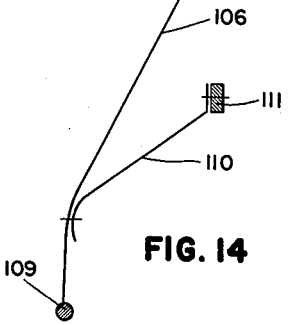
FIG. 12  FIG. 14
*INVENTORS*
GERHARD J. LEPP
RALPH C. BATEMAN
BY  KEITH L. EMBERSON
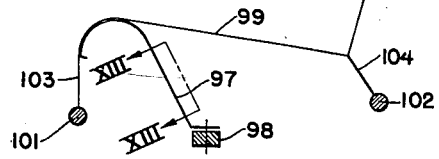
ATTORNEY Patented Feb. 19, 1952

2,586,433

UNITED STATES PATENT OFFICE 2,586,433

SEAT

Gerhard J. Lepp, Cuyahoga Falls, and Ralph C. Bateman and Keith L. Emberson, Akron, Ohio, assignors to Wingfoot Corporation, Akron, Ohio, a corporation of Delaware Application March 26, 1946, Serial No. 657,192

3 Claims. (Cl. 155—179)

This invention relates to seats, and especially to compact, light weight seats adapted for use in vehicles.

Heretofore, many types of seats have been proposed in an effort to provide a comfortable seat construction which is sturdy, compact, and inexpensive, or at least competitive in price with prior types of seats. However, the only type of seats in widespread general use today, particularly in a vehicle, has a cotton or hair padding supported by helically coiled wire springs which are space-consuming and complicated to mount and maintain in proper position, and which are heavy and relatively expensive. Only a small percentage of seats use what many people consider the most comfortable type of support material, i. e. a sponge, or cellular rubber. Cellular rubber should have some type of resilient support because the cellular rubber is relatively expensive and use of a resilient support reduces the amount of rubber required for excellent cushioning action. However, previous efforts to provide resilient supports for use with thinner pads of cellular rubber have not met with any real success, and usually seats made with cellular rubber have employed thick pads of this rubber, the cost of which is somewhat reduced by molding cavities therein.

It is the general object of the invention to avoid and overcome the foregoing and other disadvantages of known types of seats and to provide a cheaper and better seat construction, the load carrying portions of which are individually deflectable, characterized by lightness of weight, savings in space, simplicity of construction and maintenance, and a high degree of comfort.

A further object of the invention is to provide a comfortable seat which is adapted to use a very satisfactory and somewhat costly cushioning material without being more expensive than previous types of seat constructions.

Another object of the invention is the provision of a suspension or canvas lawn chair type of seat having a cushion support of canvas, flexible metal netting, or the like, giving substantially uniform body contact pressure, and characterized by a flexible support to the front edge of the seat which gives a deep cushion effect and good "show room feel" to the seat.

Another object of the invention is to provide a lighter, less bulky seat than previous types of seats.

A further object of the invention is to provide a soft seat adapted to become stiffer as deflected by load.

A further object of the invention is to provide a novel support connection between the base portion of a seat back and the rear portion of a seat base so as to prevent relative movement therebetween.

Another object of the invention is to provide a plurality of separably deflectable load carrying members at the front portion of a seat, which members move outwardly and downwardly of a seat on load application.

Another object of the invention is to position movable metal members on a metal base so as to prevent noise in movement therebetween.

A further object of the invention is to provide a novel seat construction which may be used for either a seat base, or a seat back, or both, as desired.

The foregoing objects, and other objects of our invention which will become apparent as the description proceeds, are achieved by the provision of a sheet metal seat frame, which has seat and back portions, a plurality of coil springs secured to the frame of the seat adjacent the corner between the seat and back frame sections, a plurality of aligned support arms that are pivotally associated with the seat frame at the forward portion thereof for outward and downward movement, and means connecting one or more springs to an individual support arm. The arms may have limiting straps secured to the free ends thereof to prevent the springs from moving the arms upwardly beyond a predetermined angle. On load application to the seat, it will be seen that the support arms at the front portion of the seat are individually depressed and the coil springs connected thereto are tensioned, dependent upon the load carried thereby. The seat support becomes stiffer as it is depressed on load application due to the increased tensional forces set up in the springs, which increased stiffness contributes to the riding qualities of the seat and prevents "bottoming." If a back portion for a seat is required, it may be similarly constructed, being provided with coil springs at the top of the frame and with support arms adjacent the lower portion of the seat, which springs and arms are connected similarly to that of the seat base, or the seat back may comprise a row of coil springs at the top of the seat, which springs are individually connected to the means connecting the arms and the springs of the seat base so that relative movement between the support on the seat base and that of the seat back cannot occur, or the coil springs for the back may be anchored by wires, or other means extending to the seat base frame.

Reference now should be had to the accompanying drawings, wherein Fig. 1 is a side elevation of one type of seat embodying the principles of our invention;

Fig. 2 is a fragmentary front elevation of the seat of Fig. 1;

Fig. 3 is a fragmentary plan of the seat of Fig. 1;

Fig. 4 is an enlarged vertical section of the seat of Fig. 1 with cushion material thereon;

Fig. 5 is a side elevation of a modified seat construction of the invention;

Fig. 6 is a side elevation of a further modified seat of the invention;

Fig. 7 is a fragmentary plan of a modified lower seat construction of the invention;

Fig. 8 is an enlarged section of a modified hinged support arm of the invention;

Fig. 9 is a section through another modified type of support arm construction of the invention;

Fig. 10 is a section, similar to Fig. 9, of a further modification of a support arm of the invention;

Fig. 11 is a plan of a hinge type seat back of the invention;

Fig. 12 is a modified form of support for the front or edge of the seat and back and employing a spring-type lever arm.

Fig. 13 is a view taken on line XIII—XIII of Fig. 12 and illustrating the zig-zag spring type lever arm employed; and Fig. 14 is a modification of the seat back showing a posture chair type of support.

Referring specifically to the accompanying drawings, the seat of the invention is shown as comprising a vehicle seat although it will be realized that the principles of the invention are equally applicable to the construction of other types of seats, including various types of furniture such as lounge or theatre chairs, and the like.

The seat of the invention includes a rigid metal frame which has a base 10 and a back 11 that are secured together in a suitable manner. In order to reduce weight, the frame is formed of strong but lightweight sheet metal, such as aluminum. The seat base 10 is substantially rectangular in plan and includes end support plates 12, having holes 12ᵃ therein for weight reduction and foot members 13 suitably secured thereto for support of the seat on the floor of a vehicle. A front wall or member 14 is mounted on the transverse members 15 which are, in turn, secured to the plates 12 which provide a support for the seat of the invention at any desired height above the vehicle floor to which the seat may be secured through the plates 12 and foot members 13. An anchor bracket 16 is secured to the seat frame adjacent the joint between the seat base and back to provide means for securing load receiving means to the frame. Resilient supporting structures are provided for the seat and comprise a plurality of spring means, such as coil springs 17, which are each secured by one end to the upper portion of the anchor bracket 16. A front anchor support bracket 18 is secured to and extends between the plates 12 adjacent the front thereof for transmittal of load thereto. As a further element of the resilient seat supporting structure there is provided a front anchor bracket 18 adjacent the front member 14. The bracket 18 which provides a pivotal mounting for a plurality of individual, channel-shaped sheet metal support arms 19, that are inclined upwardly and outwardly with relation to the seat but within the normal confines thereof.

The arms 19 are movable outwardly and downwardly of the seat and are suitably constructed, or so associated with the bracket 18 as to permit such movement. In this instance, hinges 20 secure the base ends of the arms to the bracket. A plurality of flexible elements or metal wires 21 are each suitably secured to and individually connects the free ends of the coil springs 17 tautly to the free ends of the associated support arms 19 so that the coil springs resiliently support the arms 19 in the manner indicated in Fig. 1, but permit individual downward movement of the free ends of the arms under load. Such movement, as will be seen, tensions the springs in excess of the normal tension therein, since the support arms are moving longitudinally of the springs. This action progressively increases the force required for downward movement of the support arms.

A plurality of restraining or individual movement limiting means, such as flexible straps 22, is normally secured to the front member 14 of the seat frame in any suitable manner and the straps extend and are connected to the free ends of the support arms 19 so as to prevent undesired upward movement thereof due to the original predetermined tension set up in the springs 17 by their engagement with the free ends of the arms. The wires 21 are advantageously made continuous through arcuate sections 19a formed on the free ends of the arms so as to connect the opposite sides thereof to adjacent springs 17. The arcuate sections 19a on the support arms provide a smooth contour suitable for the upper front edge of a seat.

In constructing the seat support for the back of the seat of the invention, Fig. 1 shows that a plurality of coil springs 22a, similar to the springs 17, may be secured at one end to the top section of an inverted U-shaped frame 23 through a channel member 24 secured thereto. These springs are secured under tension to individual wires 25 that are anchored to the forward portion of the anchor bracket 16 so that a resilient seat back support is provided for association with the seat base. Fig. 1 best shows that the wires 25 extend through the support plane provided by the free ends of the arms 19, wires 21 and springs 17 of the seat base so that a combined resilient seat base and back is provided.

Any suitable type of seat cushioning material may be used in combination with the resilient seat of the invention. However, the invention particularly contemplates the use of a thin layer of sponge, or cellular rubber 26 in combination with the resilient support of the invention since the combined action of the rubber and individual suspension levers gives a light weight, low depth seat having excellent, and comfortable, load support characteristics. In order to support a cushioning member, and form a load support layer, sheet means such as plain or wire reenforced burlap sheets 27 may be loosely positioned over the support wires 21 and 25. The burlap may be secured to certain of the wires 21 and 25 but still must be sufficiently free to permit individual movement of the wires 21 and 25. If wire reenforcement is present in the burlap sheets 27, it should extend transversely of the seat. A sisal cushion member 28 of one to two inches in thickness may be carried by the burlap sheet 27 on the seat base, and then the thin rubber pads 26, which are contoured in any desired manner, are placed over the burlap sheet, or other cover material on the load-supporting layers. A fabric cover 29 is placed over the seat assembly and secured to the seat frame in any suitable manner to complete the seat. Straps 30 may connect to the cover 29 adjacent the corner formed by the meeting of the seat base and back and extend to, and be secured to, the anchor bracket 16, or other portion of the seat frame to secure the cover in place. As previously indicated, in some instances, it may be desirable to use other cushioning material, such as rubber bonded hair, cotton, sisal, or other cushioning materials in place of the rubber pads 26.

The seat of the invention, by elimination of coil springs and heavy frame usually used in seat construction, and by formation of all metal components from lightweight sheet metal, can be made lighter, and at least as inexpensively as previous types of seats. It also occupies less space than other types of seats since both the base and back of the seat may be made shallower than those of previous seats and still provide a seat with excellent load-carrying action. Of course, such a reduced volume seat is highly desirable, especially in use of seats in vehicles, or theatres.

Fig. 5 of the drawings illustrates a modified seat construction of the invention wherein the seat base construction is the same as that shown in Figs. 1 through 4, but in this instance a modified type of seat back support is provided. The support comprises coil springs 34 carried by a back frame 35 and provided with a plurality of support arms 36 pivotally carried by the frame 35 in a row adjacent the lower portion thereof. These arms 36 are connected to the coil springs 34 by wires 37 and are positioned for downward movement with relation to the seat back when loaded. Limit straps 38 extend between the free ends of the arms and the frame 35 so that the seat back construction is similar to that provided in the seat base of the previous type seat in order that a soft, comfortable type seat back support be provided.

In Fig. 6 a further type modification of the seat of Figs. 1 through 4 is shown, and in this instance, coil springs 44, carried by a frame 45 at its upper end, are connected through wires 46 to wires 47 which connect front support arms 48 to coil springs 49 of the seat base. Thus an interconnection between the supporting layers of the seat back and the seat base is provided. As indicated hereinbefore, other connection and load-support means may be provided in place of the wires 46 and 47 and this embodiment of our invention is well suited for the use of a canvas, or other fabric, or flexible sheet in place of such wires. As in Fig. 6, the rear, or corner portion of such sheet would usually be secured to the springs 49 in order to form a more direct, resilient support for the support arms 48.

A further type of seat construction involving a modified type of seat support means is shown in Fig. 7. In this instance, a wire mesh sheet 51 is substituted for the support wires 21 of the previous types of seat constructions. This wire mesh preferably is diamond shaped, as shown, and may provide additional resiliency in the seat support. Fig. 7 shows that the apices of the wire mesh may be individually connected to the sides of support arms 52 and to coil springs 53 so that a resilient seat support layer is provided. As previously indicated, a sheet of canvas, burlap or other strong material may be used as the support layer and secured to the free ends of the support arms as well as to the springs in a manner similar to that employed with the wire mesh sheet 51.

Fig. 8 is provided to illustrate another type of support arms of the invention, which supports are specially constructed so as to insure that movement thereof will be noiseless. Such construction includes arms 61 which are carried by brackets 60 secured to a seat frame. The arms 61 are slotted at their bases and support shafts 62 are formed at the base ends of the arms. Then a metal-to-metal contact is avoided by the provision of fiber bushings, or strips 63 which are placed around the shafts 62. The arms 61 then are secured in special seats formed in the brackets 60 by clamping members 64, which extend through the slots in the arms 61 and are fastened to the bracket 60 by any suitable means, such as rivets 65. It will be realized that the shafts 62 may be separate members merely secured to the arms 61 for mounting them on the bracket, or they can be integral with the arms, as desired. Fig. 8 also shows that bushings 66 are mounted in holes 67 provided in the free ends of the arms 61. These bushings preferably are made from a plastic, or fiber material, and prevent metal-to-metal contact of support wires 68 with the arms 61. The wire 68 connects each arm 61 to a resilient support.

A further type of modified support arm of the invention, as shown in Fig. 9, comprises a base member 71, which is fixedly secured to a bracket 72 on a frame base 73 in any desired manner, and an end member 74. These members 71 and 74 are secured together by means of a spring steel hinge member 75 which is connected by rivets 76, or is otherwise secured to the support members whereby they are relatively movable and the outer or end section is free for downward movement with relation to the frame 73 on load application. This support arm construction will be noiseless in action since no contacting parts move with relation to each other.

A further modified embodiment of the support arm is shown in Fig. 10 and this construction includes a longitudinally extending front support bracket 81 which is secured in any desired manner on a seat base frame adjacent the front thereof, and has a horizontally directed finger 82 and an upwardly curved finger 83 which form a more or less U-shaped confining member adapted to receive a complementary shaped base of a support arm 84. A base section of the arm 84 is provided with a rubber or fabric sleeve or layer 85 secured thereto in any suitable manner. Such sleeve prevents a metal-to-metal contact between the bracket 81 and support arms 84, and insures a noiseless, free connection for the arms 84. The tensioning means used with the arms 84, which set up a rearwardly directed compression force on the arms 84 functions to hold the arms in their seats on the bracket 81.

When using the seat construction of the invention in a vehicle, it may be necessary to have the back of the seat pivotally mounted with relation to the seat base. Such a construction for use with the present invention is shown in Fig. 11 and includes a seat frame member 91, which is of inverted U-shape, and is provided with hinge points 92 at its ends by which the seat frame 91 may be mounted. In this instance, the resilient load support layer may comprise a plurality of parallel positioned, horizontally extending wires 93 that are secured under tension to individual coil springs 94 that are secured to each side of the frame 91 for resiliently supporting the wires and load placed thereon.

Of course, other embodiments of the invention are also readily adapted to hinged back constructions. These ordinarily entail only providing suitable hinging of the back frame to the bottom frame.

Fig. 12 diagrammatically illustrates another form of seat incorporating the features of the invention and wherein spring-type lever arms 97 are employed at the front edge of the seat bottom, and, also, if desired, at the top edge of the seat back. The spring-type lever arms may take a plurality of forms but are conveniently made as serpentine or zig-zag springs, as best seen in Fig. 13. The spring-type lever arms are usually supported at one end on frame members 98 of wood or metal, and the other ends of the lever arms are preferably curved and support and are fastened to the flexible member 99 of the seat which may be cloth, canvas, glass fabric, wire netting, wires, metal bands or sheets, or other flexible supporting means adapted to bend around the body engaging with the seat to provide more uniform body contact pressure than is obtained in many known types of seats. The flexible member 99 can be extended to and secured to the top frame member 98, as at 100, and to additional frame members 101 and 102, as at 103 and 104, or separate straps of flexible character may be used at positions 100, 103 and 104. The connections 100, and 103 may be and preferably are used to pre-tension the spring levers 97.

It will be recognized that the spring-type lever arms 97 make an angle of approximately 45 degrees, plus about 15 and minus about 10 degrees with the flexible member 99, and thus have somewhat the same arcuate swinging lever action to tighten the flexible members 99 as do the rigid lever arms when a person sits on the seat. But in addition, the spring-type lever arms act in themselves to provide the resilient support for the flexible member. The result is a very light weight, inexpensive seat characterized by a soft front edge and/or back and providing a deep cushion appearance.

It might be noted that it is not essential to this form of the invention that the flexible members 99 of seat back and bottom be tied together as shown. Each may be mounted separately as heretofore illustrated in other embodiments of the invention.

In Fig. 14 is diagrammatically shown a posture chair type of back employing the inventive features. More specifically, the numeral 106 indicates a flexible suspension member of fabric, or metal, such as heretofore described, secured directly or by one or more coiled springs 107 at its top edge to a frame member 108. The bottom edge is fastened to a frame member 109. The suspension member 106 is supported at a selected point by a spring-type lever arm 110 fastened thereto and to a frame member 111 to provide an extra support for the small of the back.

Of course, the forms of the invention shown in Figs. 12 and 14 may be provided with padding of any known type but are particularly adapted for use with cellular rubber to provide a seat possessing outstanding, unusual and unexpected comfort, lightweight, space-saving, and inexpensiveness.

It will be seen that the detailed descriptions of the modifications of the invention given herein only set forth the special features of such constructions and that the general description of the invention applies to such constructions except where modified specially in such modification.

In general, the invention contemplates only use of light weight sheet metal in formation of its support members and load is carried on the seat by depressible members resiliently supported for individual deflection under load. The support arms are so positioned with relation to the load-carrying layer as to prevent "bottoming" of such layer. If desired, the spring means at the ends, or side edges of the seat may be stiffer than the intermediate springs due to the fact that greater loads may be carried at those portions of the seat. The stiffness of the spring means used in practice of the invention may be varied to suit the amount of load to be carried and the desires of the type of person to be using the seat. Likewise, the angle of inclination of the support arms of the invention may be varied, as desired, but an angle of about 45° has been found very suitable for most seats.

In the cushioning material carried by any of the seats of the invention, usually separate pads are used on the base portion and on the back portion of the seat but unitary pads may be used when convenient.

From the foregoing, it is observed that a novel seat having desirable load supporting characteristics is provided, which seat is of lightweight, compact, and adaptable, and that the objects of the invention have been realized.

While in accordance with the patent statutes, several embodiments of the invention have been specifically illustrated and described, it should be clearly understood that the scope of the invention is not limited thereto, or thereby, but is defined in the appended claims.

What is claimed is:

1. In a seat, a frame, a plurality of coil springs secured to a rear portion of said frame, a plurality of support arms pivotally secured at one end to said frame adjacent the front thereof, said arms being positioned for movement outwardly and downwardly of but within the confines of the seat, a plurality of wires each of which is secured to and extends between the free end of one of said arms and one of said springs so as to support said arms resiliently, means for limiting the upward movement of said support arms secured to said frame and the free ends of such arms, a burlap sheet having transversely extending reenforcing wires therein carried by said wires, a thin layer of cushioning material positioned on said burlap sheet and extending over the front ends of said support arms, a thin contoured layer of sponge rubber carried by said cushioning material, and a cover positioned over said sponge rubber layer and secured to said frame for retaining the seat components in proper relation.

2. In a seat, a frame, a plurality of coil springs secured to a rear portion of said frame, a plurality of support arms pivotally associated with said frame adjacent the front thereof, said arms being positioned for movement outwardly and downwardly of the seat, a plurality of wires each of which is secured to and extends between one of said arms and one of said springs so as to support said arms, means for limiting the upward movement of said arms secured to said frame and the free ends of such arms, a cover sheet carried by said wires, a thin contoured layer of sponge rubber positioned on said sheet and extending over the front ends of said arms, and a cover positioned over said sponge rubber layer and secured to said frame to aid in retaining the seat components in proper relation.

3. A seat comprising a substantially rigid frame embodying a pair of members forming the front and rear walls thereof; a bracket mounted on the rear portion of the frame; and a series of cushion-supporting structures, each of said structures including an arm, means pivotally mounting the arm at one end thereof adjacent to the front wall of said frame, a flexible element connected to the arm adjacent the opposite end thereof and extending toward the rear wall of said frame, an anchoring device securing the flexible element to the bracket and including at least one spring interposed between the flexible element and the bracket; restraining means coacting with said anchoring devices and said flexible elements to yieldingly maintain said arms extending upwardly and forwardly at the same inclination from their pivotal mounting means, said flexible elements being normally disposed in the same plane to provide a base for supporting the seat cushion, said arms forming in effect a yielding edge for such base, and said supporting structures being independently yieldable and each of such restricted width that the imposition of a weight on a part only of the base causes a depression confined substantially to the area directly underlying such weight.

GERHARD J. LEPP.
RALPH C. BATEMAN.
KEITH L. EMBERSON.

REFERENCES CITED

The following references are of record in the file of this patent:

UNITED STATES PATENTS

| Number | Name | Date |
| --- | --- | --- |
| 211,827 | Young | Jan. 28, 1879 |
| 434,495 | Woods | Aug. 19, 1890 |
| 1,584,577 | Weickman | May 11, 1926 |
| 1,877,055 | Ruppert | Sept. 13, 1932 |
| 2,047,411 | Freund | July 14, 1936 |
| 2,251,036 | Clark | July 29, 1941 |
| 2,260,190 | Neely | Oct. 21, 1941 |
| 2,269,832 | Soper | Jan. 13, 1942 |
| 2,272,885 | Rathbun | Feb. 10, 1942 |
| 2,280,840 | Neely | Apr. 28, 1942 |
| 2,283,116 | Young | May 12, 1942 |
| 2,296,603 | Feldman | Sept. 22, 1942 |
| 2,308,772 | Neely | Jan. 19, 1943 |
| 2,330,906 | Neely | Oct. 5, 1943 |